(12) United States Patent
Takanohashi

(10) Patent No.: US 12,639,095 B2
(45) Date of Patent: May 26, 2026

(54) DATA MIGRATION SYSTEM, DATA MIGRATION METHOD, NON-TRANSITORY COMPUTER-READABLE MEDIUM FOR DATA MIGRATION PROGRAM

(71) Applicant: NEC Corporation, Tokyo (JP)

(72) Inventor: Masahiko Takanohashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 638 days.

(21) Appl. No.: 18/014,595

(22) PCT Filed: Jul. 8, 2021

(86) PCT No.: PCT/JP2021/025716
§ 371 (c)(1),
(2) Date: Jan. 5, 2023

(87) PCT Pub. No.: WO2022/009943
PCT Pub. Date: Jan. 13, 2022

(65) Prior Publication Data
US 2023/0251887 A1 Aug. 10, 2023

(30) Foreign Application Priority Data
Jul. 9, 2020 (JP) ................................ 2020-118495

(51) Int. Cl.
G06F 9/455 (2018.01)
(52) U.S. Cl.
CPC .. G06F 9/45558 (2013.01); G06F 2009/4557 (2013.01); G06F 2009/45583 (2013.01)
(58) Field of Classification Search
None
See application file for complete search history.

(56) References Cited

U.S. PATENT DOCUMENTS 10,225,331 B1 * 3/2019 Freitas .................. H04L 45/245
2017/0220371 A1 8/2017 Kosugi et al.
(Continued)

FOREIGN PATENT DOCUMENTS

JP 2017-167822 A 9/2017
JP 6197100 B2 9/2017

OTHER PUBLICATIONS

International Search Report for PCT Application No. PCT/JP2021/025716, mailed on Sep. 28, 2021.
(Continued)

*Primary Examiner* — Wynuel S Aquino
(74) *Attorney, Agent, or Firm* — Sughrue Mion, PLLC

(57) ABSTRACT

In a data migration system (1) according to an example embodiment of the present disclosure, a load balancer (20) is configured to consolidate, in a virtual machine environment (30), transactions performed in response to external requests. Then, the migration device (10) copies, via a virtual machine environment (40), storage data stored in a storage device (50) of the virtual machine environment (30) and the virtual machine environment (40) to a storage device (70) of a container environment (60). In the case where the storage data of the copy source has been changed during the aforementioned operation, the migration device (10) makes the storage data already copied to the storage device (70) consistent with the storage data of the copy source that has been changed.

7 Claims, 8 Drawing Sheets

(56)        References Cited

U.S. PATENT DOCUMENTS

| 2019/0332498 A1 * | 10/2019 | Mallik | ............... | G06F 9/45558 |
| 2020/0285547 A1 * | 9/2020 | Shukla | .................. | G06N 20/00 |
| 2021/0365186 A1 * | 11/2021 | Liu | .................... | G06F 9/45558 |

OTHER PUBLICATIONS

Morikawa, Tomonori, "Low cost rapid automatic fault recovery using containers in cloud-based VMs", IPSJ Technical Report, System Software and Operating Systems (OS), vol. 2018-OS-142, No. 8, pp. 1-8, Feb. 20, 2018, Internet: <URL:https://ipsj.ixsq.nii. ac.jp/ej/?action=repository_uri&item_id=186021&file_id=1&file_ no=1>.

* cited by examiner

DATA MIGRATION SYSTEM, DATA MIGRATION METHOD, NON-TRANSITORY COMPUTER-READABLE MEDIUM FOR DATA MIGRATION PROGRAM

This application is a National Stage Entry of PCT/JP2021/025716 filed on Jul. 8, 2021, which claims priority from Japanese Patent Application 2020-118495 filed on Jul. 9, 2020, the contents of all of which are incorporated herein by reference, in their entirety.

TECHNICAL FIELD

The present disclosure relates to a data migration system, a data migration method, and a data migration program, in particular, to a data migration system, a data migration method, and a non-transitory computer-readable medium storing a data migration program for performing migration of virtual machines.

BACKGROUND ART

Various techniques for performing migration of virtual machines have been proposed in the past. An example of such techniques is a virtual machine migration method disclosed in Patent Literature 1 in which a migration-source SBY system virtual machine is migrated to a migration-destination SBY system virtual machine through live migration, and then the system is switched from a migration-source ACT system virtual machine to the migration-destination SBY system virtual machine.

CITATION LIST

Patent Literature

Patent Literature 1: Japanese Patent No. 6197100

SUMMARY OF INVENTION

Technical Problem

However, in the virtual machine migration method disclosed in Patent Literature 1, there has been a problem that differences occur between the data stored in the storage device which the migration-source ACT system virtual machine uses and the data stored in the storage device which the migration-destination SBY system virtual machine uses in the case where the data stored in the storage device which the migration-source ACT system virtual machine uses is changed while the migration-source SBY system virtual machine is being migrated to the migration-destination SBY system virtual machine.

An object of the present disclosure is to provide, in light of the aforementioned problem, a data migration system, a data migration method, and a data migration program that enable migration of virtual machines from a virtual machine environment to a container environment while maintaining consistency between the data stored in the storage device for the virtual machine environment and the data stored in the storage device for the container environment.

Solution to Problem

A data migration system according to an example embodiment of the present disclosure includes:

a load balancer configured to consolidate, in the case where transactions have occurred in a virtual machine environment including a first virtual machine environment and a second virtual environment that serves as a backup for the first virtual machine environment, the transactions that are performed in response to external requests in the first virtual machine environment; and a migration device configured to migrate data in the virtual machine environment to a container environment after the load balancer has consolidated, in the first virtual machine environment, the transactions that are executed in response to the external requests.

The migration device includes:

storage data processing means for copying, via the second virtual environment, storage data stored in the first storage device for the first virtual machine environment and the second virtual machine environment to the second storage device for the container environment;

change judgement means for making a judgement as to whether or not the storage data of the copy source has been changed while the storage data is being copied by the storage data processing means; and consistency processing means for making the storage data already copied to the second storage device consistent with the storage data of the copy source that has been changed in the case where it is judged that the storage data of the copy source has been changed.

Further, a data migration method according to an example embodiment includes:

monitoring whether or not transactions have occurred in a virtual machine environment including a first virtual machine environment and a second virtual machine environment that serves as a backup for the first virtual machine environment;

consolidating, in the first virtual machine environment, transactions that are performed in response to external requests in the case where the transactions have occurred in the virtual machine environment;

copying, via the second virtual machine environment, storage data stored in a first storage device for the first virtual machine environment and the second virtual machine environment to a second storage device for a container environment;

making a judgement as to whether or not the storage data of the copy source has been changed while the storage data is being copied;

making the storage data already copied to the second storage device consistent with the storage data of the copy source that has been changed in the case where it is judged that the storage data of the copy source has been changed: and migrating data of the virtual machine environment to the container environment.

Furthermore, a data migration program according to an example embodiment of the present disclosure is to be executed in an information processing device configured to cause a computing device included in the information processing device to perform steps of:

monitoring whether or not transactions have occurred in a virtual machine environment including a first virtual machine environment and a second virtual machine environment that serves as a backup for the first virtual machine environment;

consolidating, in the first virtual machine environment, the transactions that are performed in response to external requests in the case where the transactions have occurred in the virtual machine environment;

copying, via the second virtual machine environment, storage data stored in a first storage device for the first virtual machine environment and the second virtual machine environment to a second storage device for a container environment;

making a judgement as to whether or not the storage data of the copy source has been changed while the storage data is being copied;

making the storage data already copied to the second storage device consistent with the storage data of the copy source that has been changed in the case where it is judged that the storage data of the copy source has been changed; and migrating data of the virtual machine environment to the container environment.

Advantageous Effects of Invention

According to the present disclosure, a data migration system, a data migration method, and a data migration program that enable migration of data from a virtual machine environment to a container environment while maintaining consistency between the data stored in the storage device for the virtual machine environment and the data stored in the storage device for the container environment can be provided.

EXAMPLE EMBODIMENT

Figure 1:
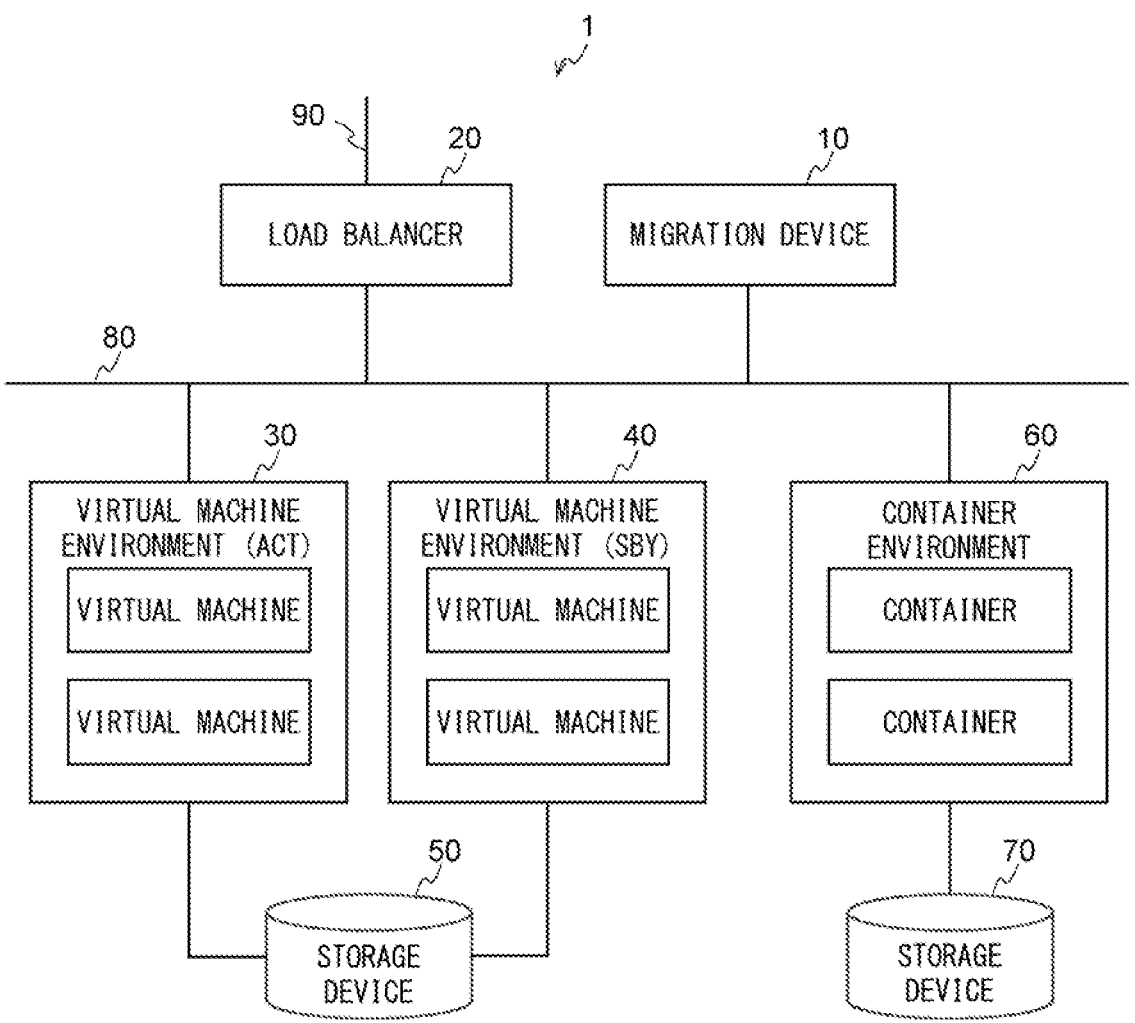
FIG. 1 is a diagram showing a data migration system according to an example embodiment of the present disclosure.

Hereinbelow, an example embodiment of the present disclosure will be described with reference to the drawings. FIG. 1 is a schematic diagram showing a data migration system 1 according to an example embodiment of the present disclosure. The data migration system 1 includes a migration device 10, a load balancer 20, a virtual machine environment (ACT: Active) 30, a virtual machine environment (SBY: Standby) 40, storage devices 50, 70, and a container environment 60.

The migration device 10 is a device for migrating data stored in the virtual machine environment (ACT) 30 and data stored in the virtual machine environment (SBY) 40 to the container environment 60. The migration device 10 can perform data communication with the load balancer 20, the virtual machine environment (ACT) 30, the virtual machine environment (SBY) 40, and the container environment 60 via a network 80. Details of the migration device 10 will be described later with reference to FIG. 2.

The load balancer 20 is a device that controls transactions in the virtual machine environment (ACT) 30 and the virtual machine environment (SBY) 40. The load balancer 20 can perform data communication with the virtual machine environment (ACT) 30 and the virtual machine environment (SBY) 40 via the network 80. The load balancer 20 can perform data communication with an external device(s) (not shown) via a network 90. Details of the load balancer 20 will be described later with reference to FIG. 3.

The virtual machine environment (ACT) 30 is an information processing device that runs one or more virtual machines. The virtual machine environment (ACT) 30 functions as a virtual machine environment of an active system. The virtual machine environment (ACT) 30 corresponds to a first virtual machine environment. Note that while in FIG. 1, only two virtual machines are shown for the sake of explanation, the virtual machine environment (ACT) 30 can run any number of virtual machines.

The virtual machine environment (SBY) 40 is an information processing device that runs one or more virtual machines. The virtual machine environment (SBY) 40 is a virtual machine environment for a standby system and serves as a backup for the virtual machine environment (ACT) 30. The virtual machine environment (SBY) 40 corresponds to a second virtual machine environment. Note that while in FIG. 1, only two virtual machines are shown for the sake of simplifying the explanation, the virtual machine environment (SBY) 40 can run any number of virtual machines.

The storage device 50 is used by the virtual machine environment (ACT) 30 and the virtual machine environment (SBY) 40. The storage device 50 stores various data to be used by the virtual machines in the virtual machine environment (ACT) 30 and the virtual machine environment (SBY) 40. The storage device 50 corresponds to the first storage device. Hereinafter, the data stored in the storage device 50 is referred to as storage data.

The container environment 60 is an information processing device that runs the containers corresponding to the virtual machines in the virtual machine environment (ACT) 30 and the virtual machine environment (SBY) 40. While in FIG. 1, only two containers are shown for the sake of simplifying the explanation, the container environment 60 can run any number of containers.

The storage device 70 is used by the container environment 60. The storage device 70 stores various data to be used by the containers in the container environment 60. The storage device 70 corresponds to the second storage device.

Figure 2:
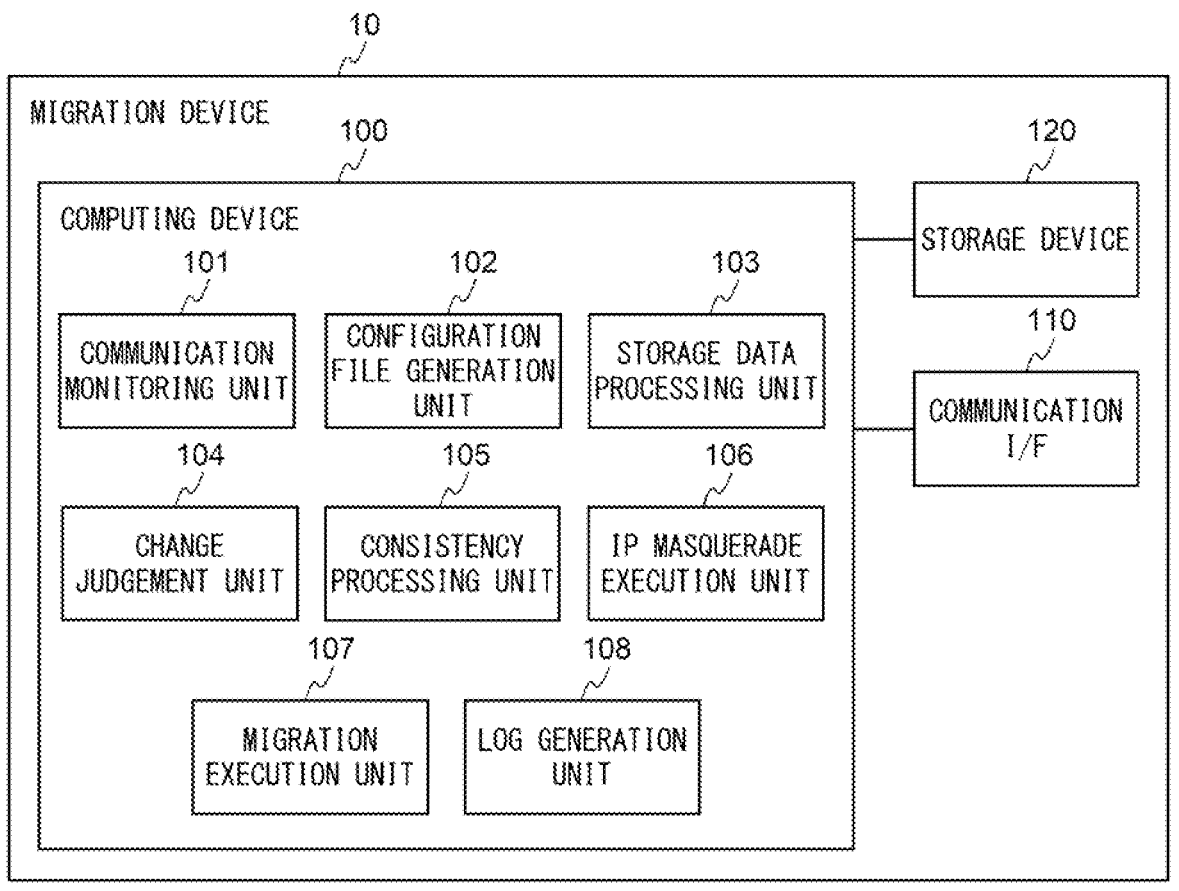
FIG. 2 is a block diagram showing a configuration of a migration device according to an example embodiment of the present disclosure.

FIG. 2 is a block diagram showing a configuration of the migration device 10. The migration device 10 includes a computing device 100, a communication interface (I/F) 110, and a storage device 120.

The computing device 100 is a processor such a CPU or an MPU that controls the devices and the circuits included in the migration device 10. The computing device 100 performs a data migration method by executing data migration programs stored in the storage device 120. The data migration programs include a communication monitoring unit 101, a configuration file generation unit 102, a storage data processing unit 103, a change judgement unit 104, a consistency processing unit 105, an IP (Internet Protocol) masquerade execution unit 106, a migration execution unit 107, and a log generation unit 108. Note that the functions of these programs can be realized by integrated circuits such as a FPGA (Field-Programmable Gate Array) and an ASIC (Application Specific Integrated Circuit).

The communication monitoring unit 101 is a program for making a determination as to whether or not the migration device 10 can perform communication with both the virtual machine environment (SBY) 40 and the container environment 60.

The configuration file generation unit 102 is a program for generating configuration files of the plurality of virtual machines included in the virtual machine environment (ACT) 30 and the virtual machine environment (SBY) 40. Specifically, the configuration file generation unit 102 can access the console of the virtual machine in the virtual machine environment (SBY) 40 and acquire, using the predetermined commands (df commands etc.), storage capacity information indicating the storage data capacity of the application which is currently run by the virtual machine and the storage type information indicating the type of storage data used by the currently-run application.

There are a stateless type and a stateful type for the storage type information. Stateless type information refers to storage data that is not permanently stored. Stateful type information refers to storage data that is permanently stored. The type of storage data is determined for each application executed by the virtual machines.

Further, the configuration file generation unit 102 can access the console of the virtual machine in the virtual machine environment (SBY) 40 and acquire, using the predetermined commands (netstat command and ps command, etc.), active application information indicating information about active applications in the virtual machine.

Using the storage capacity information, the storage type information and the active application information acquired as described above, the configuration file generation unit 102 generates a configuration file.

The storage data processing unit 103 is a program for copying the storage data stored in the storage device 50 to the storage device 70 via the virtual machine environment (SBY) 40. More specifically, the storage data processing unit 103 uses the configuration files of the respective virtual machines to copy the storage data of the virtual machines included in the virtual machine environment (SBY) 40 to the storage devices 70 of the respective virtual machines. For example, the storage data processing unit 103 can create storage data from the yaml file, which is a configuration file, and mount the created storage data onto the storage device 70.

The change judgement unit 104 is a program for making a judgement as to whether or not the storage data of the copy source has been changed while the storage data of the storage device 50 is being copied to the storage device 70 by the storage data processing unit 103. The consistency processing unit 105 is a program for making the storage data already copied to the storage device 70 of the container environment 60 consistent with the storage data of the copy source.

The IP masquerade execution unit 106 is a program for executing the processing of IP masquerade in the case where each of the virtual machine environment (ACT) 30 and the virtual machine environment (SBY) 40 has a plurality of network interface cards (NIC). Specifically, the IP masquerade execution unit 106 converts the IP addresses allocated to the plurality of network interface cards of the virtual machine environment (ACT) 30 and the virtual machine environment (SBY) 40 to a single IP address and allocates the obtained single IP address to the container environment 60.

The migration execution unit 107 is a program for executing migration processing of storage data from the virtual machine environment (SBY) 40 to the container environment 60. For example, the migration execution unit 107 can compress VM (Virtual Machine) images and import them as containers. The log generation unit 108 is a program for generating execution logs for migration processing.

The communication interface 110 is a device for performing data communication between the migration device 10 and another device. The storage device 120 is a storage device in which various information such as programs and the like to be executed by the computing device 100 are stored.

Figure 3:
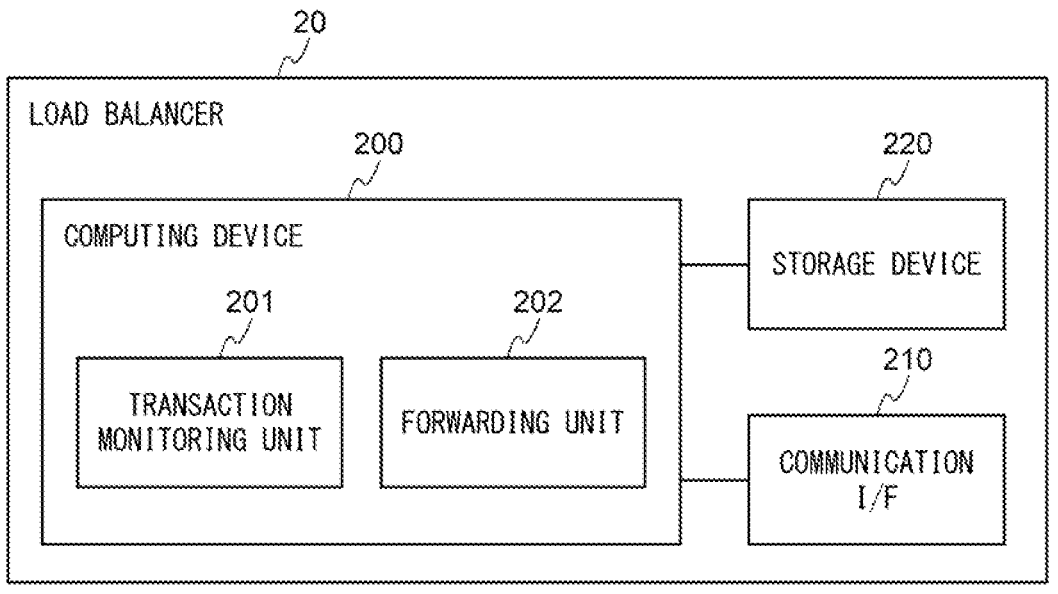
FIG. 3 is a block diagram showing a configuration of a load balancer according to an example embodiment of the present disclosure.

FIG. 3 is a block diagram showing a configuration of the load balancer 20. The load balancer 20 includes a computing device 200, a communication interface 210, and a storage device 220.

The computing device 200 is a processor such a CPU or an MPU that controls the devices and the circuits included in the load balancer 20. The computing device 200 executes a program stored in the storage device 220. This program includes a transaction monitoring unit 201 and a forwarding unit 202. Note that the functions of these programs can be realized by integrated circuits such as FPGA and ASIC.

The transaction monitoring unit 201 is a program for making a determination as to whether or not a transaction has occurred in at least one of the virtual machine environment (ACT) 30 and the virtual machine environment (SBY) 40.

The forwarding unit 202 is a program for forwarding requests received from external devices via the network 90 to the virtual machine environment (ACT) 30 and the virtual machine environment (SBY) 40. The forwarding unit 202 can consolidate, in the virtual machine environment (ACT) 30, the transactions that are performed in response to the external requests by forwarding the external requests to virtual machine environment (ACT) 30.

The communication interface 210 is a device for performing data communication between the load balancer 20 and another device. The storage device 220 is a storage device in which various information such as programs and the like to be executed by the computing device 200 are stored.

Figure 4:
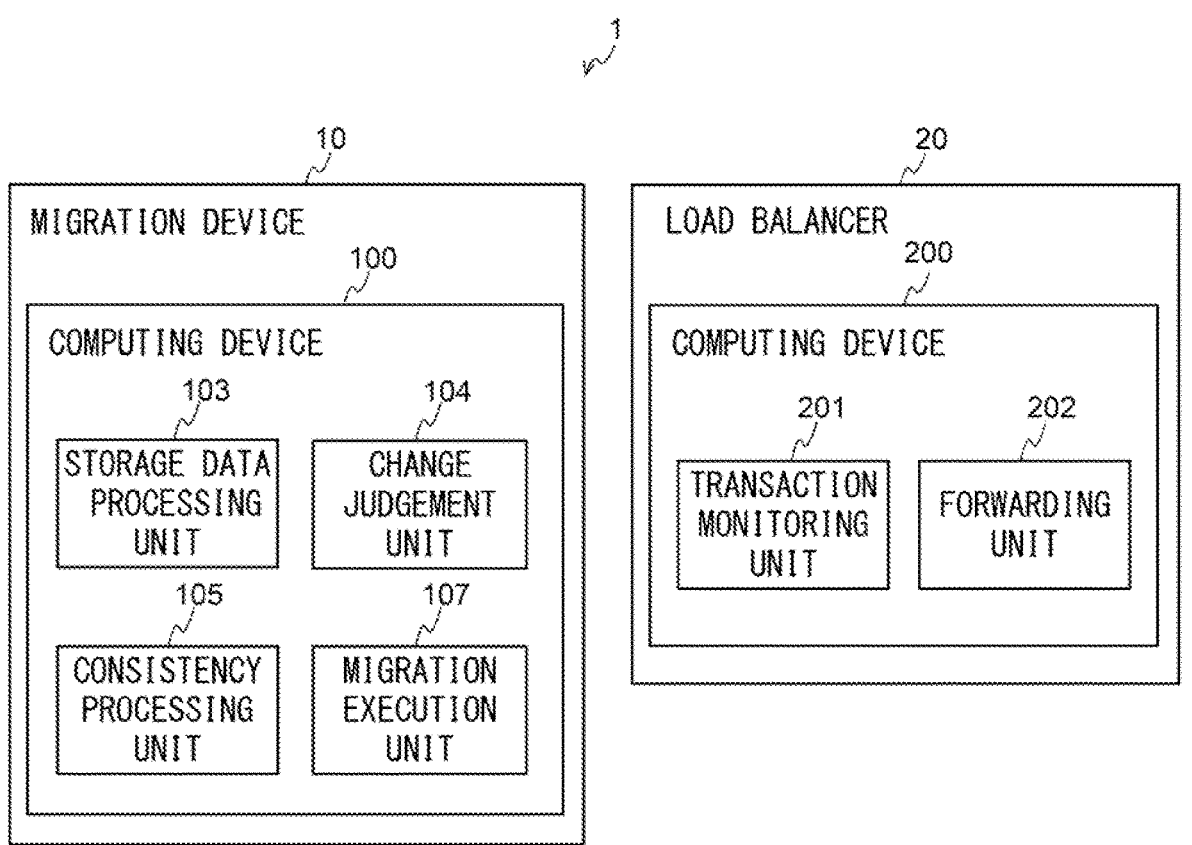
FIG. 4 is a block diagram showing key structural elements included in a data migration system according to an example embodiment of the present disclosure.

FIG. 4 is a block diagram showing key structural elements included in the data migration system 1 according to an example embodiment of the present disclosure. The data transition system 1 includes the migration device 10 and the load balancer 20. The migration device 10 includes the aforementioned storage data processing unit 103, the change judgement unit 104, the consistency processing unit 105, and the migration execution unit 107. The load balancer 20 includes the transaction monitoring unit 201 and the forwarding unit 202.

Figure 5:
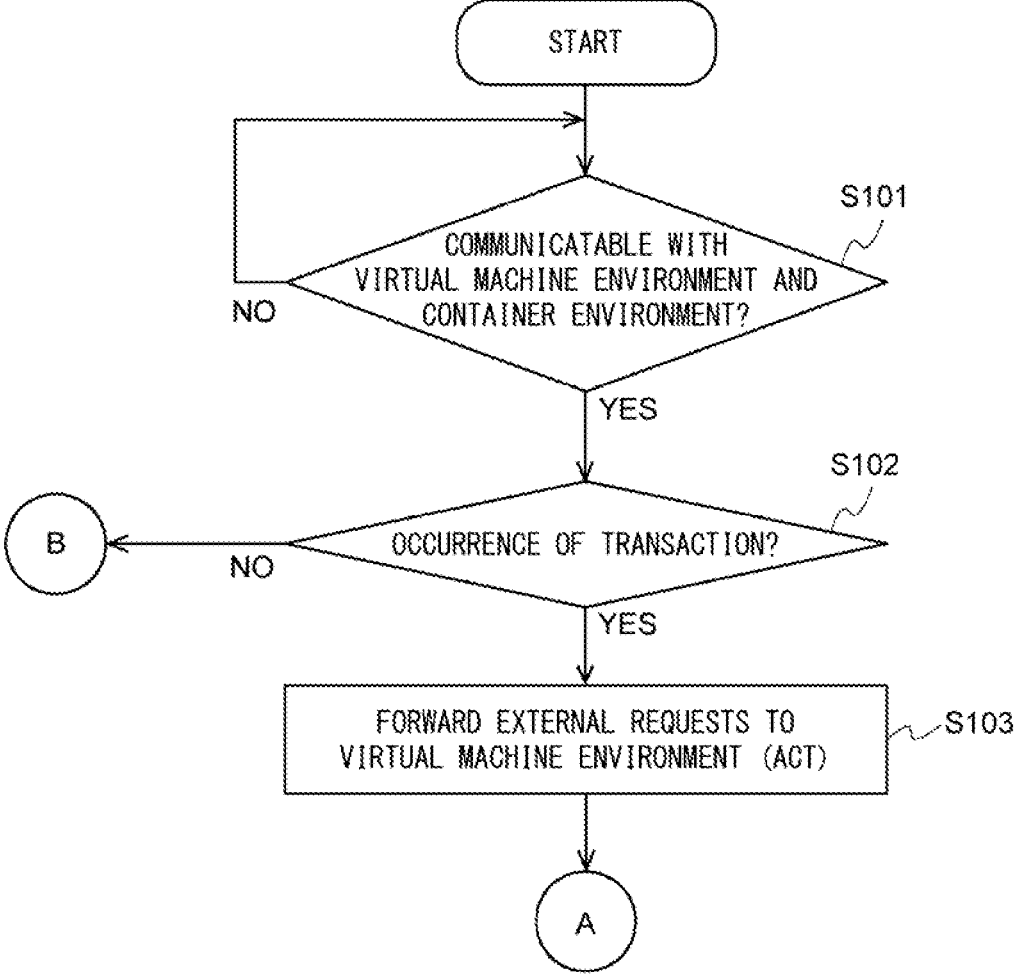
FIG. 5 is a sequence diagram showing an example of processing performed by a data migration system according to an example embodiment of the present disclosure.
Figure 6:
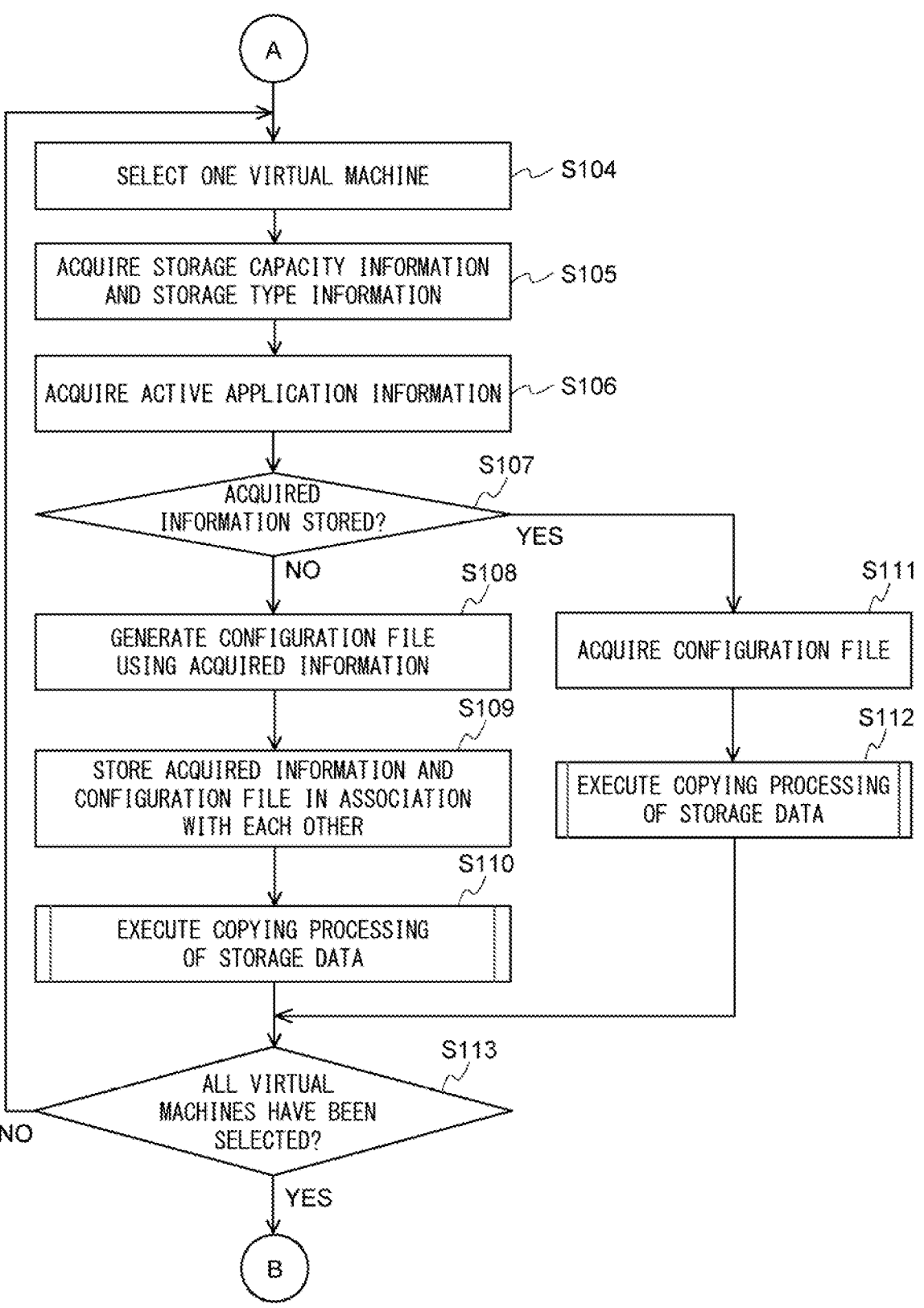
FIG. 6 is a sequence diagram showing an example of processing performed by a data migration system according to an example embodiment of the present disclosure.

FIG. 5 is a sequence diagram showing an example of processing performed by the data migration system 1 according to an example embodiment of the present disclosure. In Step S101, the communication monitoring unit 101 of the migration device 10 makes a determination as to whether communication can be performed with both the virtual machine environment (SBY) 40 and the container environment 60. In the case where communication cannot be performed with at least one of the virtual machine environment (SBY) 40 and the container environment 60 (NO), the processing of Step S101 is repeated. On the other hand, in the case where communication can be performed with both the virtual machine environment (SBY) 40 and the container environment 60 (YES), processing branches off to Step S102.

In Step S102, the transaction monitoring unit 201 of the load balancer 20 makes a determination as whether or not a transaction has occurred in at least one of the virtual machine environment (ACT) 30 and the virtual machine environment (SBY) 40. In the case where no transaction has occurred (NO), processing branches off to Step S114. On the other hand, in the case where a transaction has occurred (YES), in Step S103, the forwarding unit 202 of the load balancer 20 forwards, to the virtual machine environment (ACT) 30, the external requests to the virtual machine environment (ACT) 30 and the virtual machine environment (SBY) 40.

In Step S104, the configuration file generation unit 102 selects one virtual machine among the virtual machines. In Step S105, the configuration file generation unit 102 acquires the storage capacity information and the storage type information about the selected virtual machine. In Step S106, the configuration file generation unit 102 acquires the active application information for the selected virtual machine.

In Step S107, the configuration file generation unit 102 makes a determination as to whether or not the information acquired in Step S105 and Step S106 is stored in the storage device 120. In the case where these pieces of information are not stored in the storage device 120 (NO), in Step S108, the configuration file generation unit 102 generates a configuration file using the acquired information. In Step S109, the configuration file generation unit 102 stores, in the storage device 120, the information acquired in Step S105 and Step S106 and the configuration file generated in Step S108 in association with each other. In Step S110, the storage data processing unit 103 executes copying processing of the storage data using the configuration file generated in Step S106. Details of the processing of copying the storage data will be described later with reference to FIG. 8.

On the other hand, in the case where the information acquired in Step S105 and Step S106 is stored in the storage device 120 (YES), in Step S111, the storage data processing unit 103 acquires, from the storage device 120, the configuration file associated with the information acquired in Step S105 and Step S106. In Step S112, the storage data processing unit 103 executes copying processing of the storage data using the configuration file acquired in Step S111.

Figure 7:
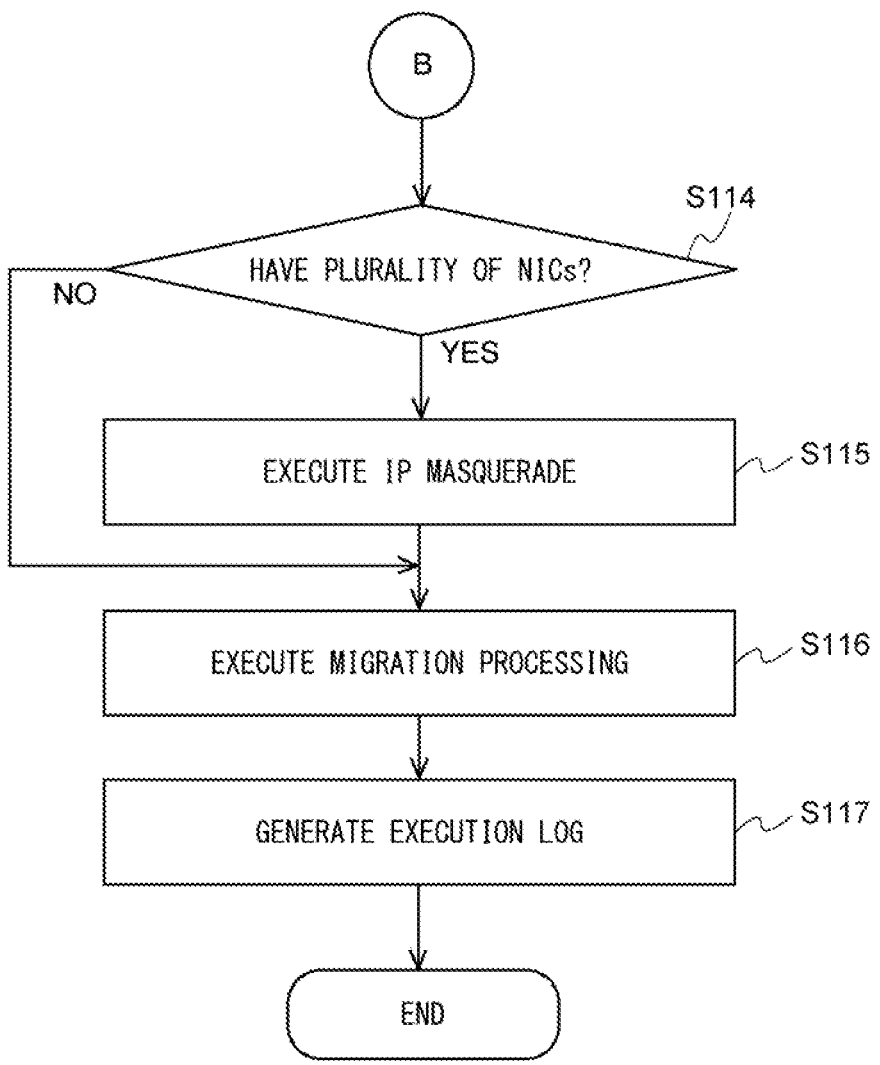
FIG. 7 is a sequence diagram showing an example of processing performed by a data migration system according to an example embodiment of the present disclosure.

In Step S113, the configuration file generation unit 102 makes a judgement as to whether or not all of the virtual machines have been selected. In the case where all of the virtual machines have not been selected (NO), the processing returns to Step S104 in which one virtual machine among the virtual machines which has not been selected yet is selected and the above-described processing is performed for the selected virtual machine. On the other hand, in the case where all of the virtual machines have been selected (YES), the processing branches off to Step S114 shown in FIG. 7.

In Step S114, the IP masquerade execution unit 106 makes a judgement as to whether or not the virtual machine environment (ACT) 30 and the virtual machine environment (SBY) 40 have a plurality of NICs. In the case where the virtual machine environment (ACT) 30 and the virtual machine environment (SBY) 40 do not have a plurality of NICs (NO), the processing branches off to Step S116. On the other hand, in the case where the virtual machine environment (ACT) 30 and the virtual machine environment (SBY)

40 have a plurality of NICs (YES), in Step S115, the IP masquerade execution unit 106 executes the processing of IP masquerade.

In Step S116, the migration execution unit 107 executes migration processing. In Step S117, the log generation unit 108 generates the execution log for performing migration processing and the processing shown in FIG. 7 ends.

Figure 8:
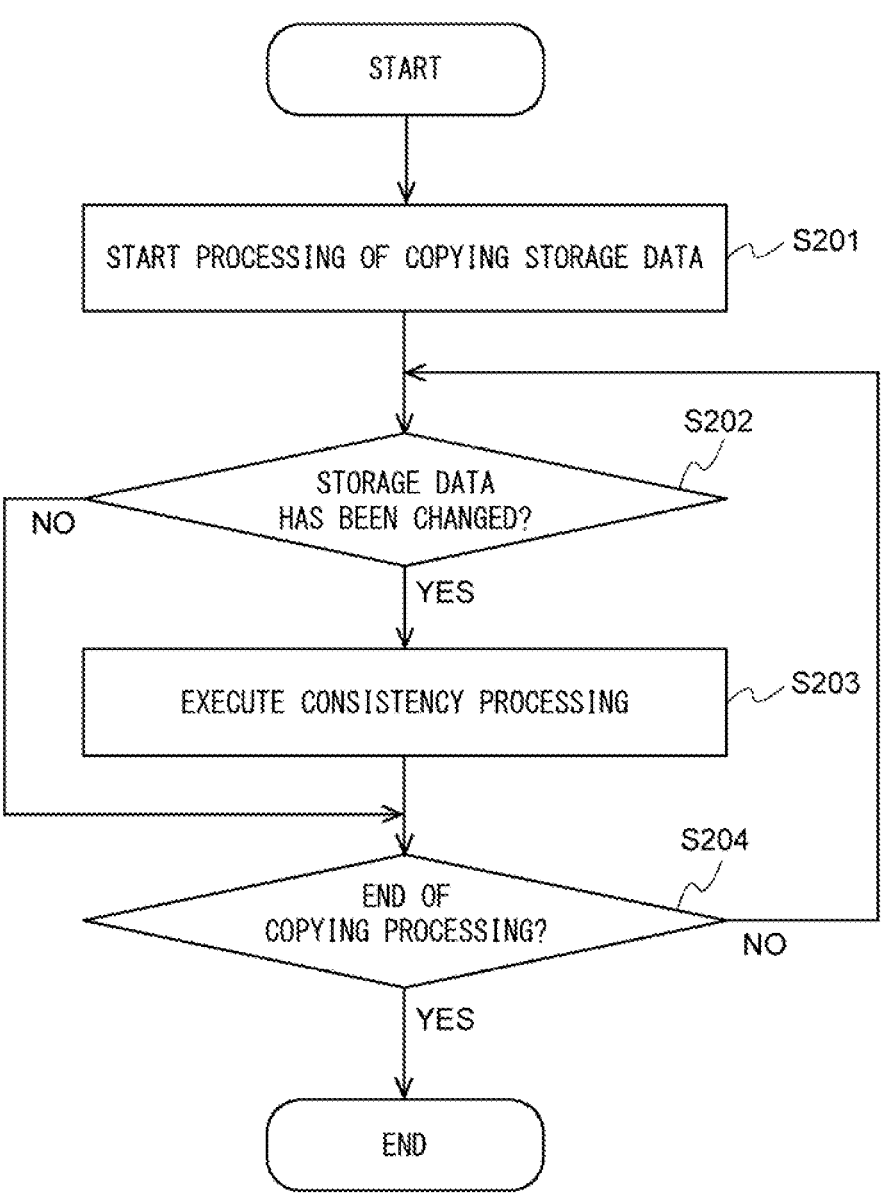
FIG. 8 is a sequence diagram showing an example of processing performed by a migration device according to an example embodiment of the present disclosure.

A flow chart in FIG. 8 shows an example of the processing performed by a migration device according to an example embodiment of the present disclosure. In Step S201, the storage data processing unit 103 starts the processing of copying, from the storage device 50 via the virtual machine environment (SBY) 40 to the storage device 70, the storage data of the virtual machine which has been selected using the configuration file of the selected virtual machine. In Step S202, the change judgement unit 104 monitors whether or not the storage data of the copy source has been changed while the storage data is being copied. In the case where the storage data of the copy source has not been changed (NO), the processing proceeds to Step S204. On the other hand, in the case where the storage data of the copy source has been changed (YES), the processing proceeds to Step S203.

In Step S203, the consistency processing unit 105 makes the storage data already copied to the storage device 70 of the container environment 60 consistent with the storage data of the copy source. In Step S204, the storage data processing unit 103 makes a determination as to whether or not the processing of copying the storage data of the selected virtual machine has ended. In the case where the processing of copying the storage data has not ended (NO), the processing returns to Step S202. On the other hand, when the processing of copying the storage data has ended (YES), the processing of FIG. 8 ends.

In the aforementioned example embodiment, in the case where transactions have occurred in at least one of the virtual machine environment (ACT) 30 and the virtual machine environment (SBY) 40, the load balancer 20 of the forwarding unit 202 consolidates the transactions that are performed in response to the external requests in the virtual machine environment (SBY) 40. Then, the storage data processing unit 103 of the migration device 10 performs processing of copying, via the virtual machine environment (SBY) 40, the storage data stored in the storage device 50 to the storage device 70 of the container environment 60. Then, the migration execution unit 107 of the migration device 10 executes migration processing of storage data from the virtual machine environment to the container environment.

By this configuration, the transactions that are performed in response to the external requests are consolidated in the virtual machine environment (SBY) 40, and then the migration device 10 can execute migration processing of stored data from the virtual machine environment to the container environment via the virtual machine environment (SBY) 40 in which the aforementioned transactions have not occurred. Accordingly, it is possible to realize migration of stored data from the virtual machine environment to the container environment without causing downtime in the virtual environment.

Further, in the aforementioned example embodiment, the change judgement unit 104 makes a judgement as to whether or not the storage data of the copy source has been changed while the storage data is being copied by the storage data processing unit 103. In the case where it is judged that the storage data of the copy source has been changed, the consistency processing unit 105 makes the data already copied to the storage device 70 consistent with the changed data of the copy source. By this configuration, it is possible to perform migration processing of data from a storage device for a virtual machine environment to a storage device for a container environment while maintaining consistency between the data stored in the storage device for the virtual machine environment and the data stored in the storage device for the container environment.

Further, in the aforementioned example embodiments, the configuration file generation unit 102 generates configuration files of a plurality of virtual machines included in the virtual machine environment (ACT) 30 and the virtual machine environment (SBY) 40. The storage data processing unit 103 copies the storage data of the second virtual machine included in the virtual machine environment (SBY) 40 by using the configuration file generated for the first virtual machine included in the virtual machine environment (SBY) 40. That is, the storage data processing unit 103 copies the storage data of the second virtual machine by employing the configuration file of the first virtual machine. By this configuration, it is possible to prevent extra configuration files from being created.

Further, in the aforementioned example embodiment, the configuration file includes the storage type information indicating the types of storage data used by the applications that are currently run by the virtual machines. The storage type information includes information indicating storage data that is not permanently stored and information indicating storage data that is permanently stored. The types of storage data are determined for respective applications that are currently run by the virtual machines. By using the configuration file in which the storage type information is stated as described above, it is possible to pass on the storage type information of each application in the container environment after the migration processing has been performed. For example, an application storage type information of which is stateful in the virtual machine environment can have its storage data permanently stored also in the container environment. On the other hand, an application storage data of which is stateless in the virtual machine environment does not have its storage data permanently stored even in the container environment.

Further, in the aforementioned example embodiment, in the case where the virtual machine environment (ACT) 30 and the virtual machine environment (SBY) 40 have a plurality of NICs, the IP masquerade execution unit 106 converts the IP addresses allocated to a plurality of NICs to a single IP address and allocates the obtained single IP address to the container environment 60. Normally, since a container environment is allocated only one NIC, in the case where a virtual machine environment has a plurality of NICs, the containers within the container environment are unable to properly execute processing with the IP address. In the aforementioned example embodiment, in the case where the virtual machine environment has a plurality of NICs for the IP masquerade execution unit 106 to execute the processing of IP masquerade, the container is able to properly execute processing with the IP address.

OTHER EXAMPLE EMBODIMENTS

While in the aforementioned example embodiment, the migration device and the load balancer 20 are configured as separate devices, in another example embodiment, the migration device 10 and the load balancer 20 may be configured as one device. Specifically, the data migration program executed by the data the migration device 10 includes the communication monitoring unit 101, the configuration file generation unit 102, the storage data processing unit 103, the change judgement unit 104, the consistency processing unit 105, the IP masquerade execution unit 106, the migration execution unit 107, the log generation unit 108, the transaction monitoring unit 201, and the forwarding unit 202. The migration device 10 can perform a data migration method shown in FIGS. 5 to 8 by executing the aforementioned data migration programs.

In another example embodiment, it is possible to specify redundancy in the container environment which is the system that has been migrated. In this case, the configuration file generation unit 102 generates a configuration file in which redundancy in the container environment has been specified. Then, the migration execution unit 107 can generate a plurality of duplicate containers based on the configuration file in which redundancy is specified. For example, in the migration execution unit 107 can realize the redundancy by configuring a plurality of Pods to be managed as containers in Pod units.

Furthermore, in another example embodiment, it is possible to specify sizing setting optimized in the container environment 60 that is the system which has been migrated. In this case, a plurality of sets of CPU and memory size are prepared in the container environment. The configuration file generation unit 102 generates a configuration file in which the sets of CPU and memory size to be used in the container environment 60 are specified. This configuration is provided to the container environment 60 by the migration device 10. For example, the migration execution unit 107 can provide the aforementioned configuration file to the container environment 60. In the container environment 60, various processings are executed using the CPU and the memory size specified in the aforementioned configuration file. By this configuration, it is possible to realize optimized sizing setting.

Further, in another example embodiment, it is possible to set the upper limit values of the CPU and memory capacities to meet the requirements of the container environment 60. Specifically, the configuration file generation unit 102 can describe the upper limit values of capacities of the CPU and the memory to be used by the containers in the configuration file such as the yaml file. The aforementioned configuration file is provided to the container environment 60 by the migration device 10. Each container in the container environment 60 performs various processings in accordance with the upper limit values of the CPU and the memory specified in the aforementioned configuration file. By this configuration, it is possible to meet the requirements for the container environment 60.

Further, in another example embodiment, in the case where a clustering configuration configured of a plurality of applications is deployed in the virtual machine environment 30, that is a redundant configuration is employed, it possible to realize the clustering function in the container environment 60 as well. To be more specific, the configuration file generation unit 102 generates a configuration file in which the load balancing by the Ingress Controller and the HA cluster by the Pacemaker bundle are specified. Accordingly, the migration execution unit 107 can log into the Ingress Controller and the Pacemaker bundle based on the aforementioned configuration file and input the settings for executing load balancing and HA cluster in the container environment 60. Accordingly, it is possible to realize the clustering function in the container environment 60.

In the aforementioned example embodiment the program can be stored and provided to a computer using any type of non-transitory computer readable media. Non-transitory computer readable media include any type of tangible storage media. Examples of non-transitory computer readable media include magnetic storage media (e.g., floppy disks, magnetic tapes, and hard disk drives), optical magnetic storage media (e.g., magneto-optical disks), CD-ROM, CD-R, CD-R/W, and semiconductor memories (e.g., mask ROM, PROM (Programmable ROM), EPROM (Erasable PROM), flash ROM, RAM (Random Access Memory)). Further, the program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The present disclosure is not limited to the aforementioned example embodiments and can be changed as appropriate without departing from the gist of the present disclosure.

This application is based upon and claims the benefit of priority from Japanese patent application No. 2020-118495, filed on Jul. 9, 2020, the entire contents of which are incorporated herein by reference.

REFERENCE SIGNS LIST

1 DATA MIGRATION SYSTEM
10 MIGRATION DEVICE
100 COMPUTING DEVICE
103 STORAGE DATA PROCESSING UNIT
104 CHANGE JUDGEMENT UNIT
105 CONSISTENCY PROCESSING UNIT
107 MIGRATION EXECUTION UNIT
20 LOAD BALANCER
201 TRANSACTION MONITORING UNIT
202 FORWARDING UNIT
30 VIRTUAL MACHINE ENVIRONMENT (ACT)
40 VIRTUAL MACHINE ENVIRONMENT (SBY)
50, 70 STORAGE DEVICE
60 CONTAINER ENVIRONMENT
80, 90 NETWORK

What is claimed is:

1. A data migration system comprising:
a load balancer comprising:
a first memory; and
a first processor coupled with the first memory, wherein the first processor is configured to:
consolidate, in the case where transactions have occurred in a virtual machine environment including a first virtual machine environment and a second virtual environment that serves as a backup for the first virtual machine environment, the transactions in the first virtual machine environment; and
a migration device comprising:
a second memory; and
a second processor coupled with the second memory, wherein the second processor is configured to:
migrate data in the virtual machine environment after the load balancer has consolidated, in the first virtual machine environment, the transactions;
copy, via the second virtual environment, storage data stored in a first storage device for the first virtual machine environment and the second virtual machine environment to a second storage device;

make a judgement as to whether or not the storage data of the copy source has been changed while the storage data is being copied; and
make the storage data already copied to the second storage device consistent with the storage data of the copy source that has been changed in the case where it is judged that the storage data of the copy source has been changed.

2. The data migration system according to claim 1, wherein the second processor is further configured to:
generate configuration files of the plurality of virtual machines included in the first virtual machine environment and the second virtual machine environment; and
copy the storage data of the second virtual machine included in the second virtual machine environment using the configuration files generated for the first virtual machine included in the second virtual machine environment.

3. The data migration system according to claim 2, wherein:
the configuration files include the storage type information indicating the types of storage data used by applications that are currently run by the virtual machines,
the storage type information includes information indicating storage data that is not permanently stored and information indicating storage data that is permanently stored, and
the types of storage data are determined for respective applications that are currently run by the virtual machines.

4. The data migration system according to claim 1, wherein the second processor is further configured to:
convert IP (Internet Protocol) addresses allocated to a plurality of network interface cards to a single IP address; and
allocate the single IP address in the case where the virtual machine environment has the plurality of network interface cards.

5. The data migration system according to claim 1, wherein the first processor is further configured to:
consolidate the transactions that are performed in response to external requests in the first virtual machine environment; and
wherein the second processor is further configured to:
migrate data in the virtual machine environment to a container environment after the load balancer has consolidated, in the first virtual machine environment, the transactions that are executed in response to the external requests; and
copy the storage data to the second storage device for the container environment.

6. A data migration method performed by a computer the data migration method comprising:
monitoring whether or not transactions have occurred in a virtual machine environment including a first virtual machine environment and a second virtual machine environment that serves as a backup for the first virtual machine environment;
consolidating in the first virtual machine environment, transactions in the case where the transactions have occurred in the virtual machine environment;
copying, via the second virtual environment, storage data stored in a first storage device for the first virtual machine environment and the second virtual machine environment to a second storage device;

making a judgement as to whether or not the storage data of the copy source has been changed while the storage data is being copied;

making the storage data already copied to the second storage device consistent with the storage data of the copy source that has been changed in the case where it is judged that the storage data of the copy source has been changed; and migrating data of the virtual machine environment.

7. A non-transitory computer-readable medium, excluding signal bearing media, storing a data migration program to be executed in an information processing device, wherein the data migration program is configured to cause a computing device included in the information processing device to:

monitor whether or not transactions have occurred in a virtual machine environment including a first virtual machine environment and a second virtual machine environment that serves as a backup for the first virtual machine environment;

consolidate, in the first virtual machine environment, the transactions in the case where the transactions have occurred in the virtual machine environment;

copy, via the second virtual environment, storage data stored in a first storage device for the first virtual machine environment and the second virtual machine environment to a second storage device;

make a judgement as to whether or not the storage data of the copy source has been changed while the storage data is being copied;

make the storage data already copied to the second storage device consistent with the storage data of the copy source that has been changed in the case where it is judged that the storage data of the copy source has been changed; and migrate data of the virtual machine environment-.

* * * * *